United States Patent
Siohan et al.

(10) Patent No.: US 8,693,505 B2
(45) Date of Patent: Apr. 8, 2014

(54) METHODS FOR TRANSMITTING AND RECEIVING A MULTICARRIER SIGNAL IMPLEMENTING PROTOTYPE FILTERS, CORRESPONDING DEVICES FOR TRANSMITTING AND RECEIVING, SIGNAL AND COMPUTER PROGRAM

(75) Inventors: Pierre Siohan, Rennes (FR); Hao Lin, Rennes (FR)

(73) Assignee: France Telecom, Paris (FR)

( * ) Notice: Subject to any disclaimer, the term of this patent is extended or adjusted under 35 U.S.C. 154(b) by 59 days.

(21) Appl. No.: 13/378,275

(22) PCT Filed: Jun. 15, 2010

(86) PCT No.: PCT/FR2010/051189
§ 371 (c)(1),
(2), (4) Date: Dec. 14, 2011

(87) PCT Pub. No.: WO2010/146301
PCT Pub. Date: Dec. 23, 2010

(65) Prior Publication Data
US 2012/0093176 A1  Apr. 19, 2012

(30) Foreign Application Priority Data
Jun. 16, 2009 (FR) ...................... 09 54055

(51) Int. Cl.
*H04J 1/02* (2006.01)
(52) U.S. Cl.
USPC .......................................... 370/497
(58) Field of Classification Search
USPC ................................ 370/254–340
See application file for complete search history.

(56) References Cited

U.S. PATENT DOCUMENTS

| 7,292,642 | B2 | 11/2007 | Gonzalez et al. |
| 8,194,531 | B2 * | 6/2012 | Lele et al. ...................... 370/206 |
| 8,401,109 | B2 * | 3/2013 | Lele et al. ...................... 375/295 |
| 2006/0133519 | A1 | 6/2006 | Tsatsanis et al. |
| 2008/0080627 | A1 | 4/2008 | Korhonen et al. |
| 2009/0316569 | A1 | 12/2009 | Lele et al. |
| 2011/0110458 | A1 * | 5/2011 | Siohan et al. ................. 375/295 |

FOREIGN PATENT DOCUMENTS

| WO | 0225883 A1 | 3/2002 |
| WO | 2006004980 A1 | 1/2006 |
| WO | 2008007019 A2 | 1/2008 |
| WO | 2008007030 A2 | 1/2008 |

OTHER PUBLICATIONS

French Search Report dated Feb. 19, 2010 for corresponding French Application No. FR 0954055, filed Jun. 16, 2009.

(Continued)

*Primary Examiner* — Ayaz Sheikh
*Assistant Examiner* — Debebe Asefa
(74) *Attorney, Agent, or Firm* — David D. Brush; Westman, Champlin & Koehler, P.A.

(57) ABSTRACT

A method is provided for transmitting a multicarrier signal formed by a temporal succession of multicarrier symbols, which includes: at least one preamble formed by at least three successive multicarrier symbols, known as preamble symbols, including complex-value data elements each associated with a carrier of the signal; and multicarrier symbols, known as data symbols, including real-value data elements each associated with a carrier of the signal. The method includes a carrier-shaping step including filtering the carriers of the preamble symbols using a first prototype filter, and filtering the carriers of the data symbols using a second prototype filter different from the first prototype filter.

11 Claims, 4 Drawing Sheets

(56) References Cited

OTHER PUBLICATIONS

International Search Report dated Sep. 29, 2010 for corresponding International Application No. PCT/FR2010/051189, filed Jun. 15, 2010.

Doroslovacki M. I.: "Product of Second Moments in Time and Frequency for Discrete-Time Signals and the Uncertainty Limit" —Signal Processing, vol. 67, 1998.

Matz et al., "Analysis, Optimization, and Implementation of Low-Interference Wireless Multicarrier Systems" IEEE Transactions on Wireless Communications, vol. 6, No. 5, May 1, 2007.

English Translation of the Written Opinion dated Sep. 29, 2010 for corresponding International Application No. PCT/FR2010/051189, field Jun. 15, 2010.

Le Floch et al., "Coded Orthogonal Frequency Division Multiplex", Proceedings of the IEEE, vol. 83, No. 6, Jun. 1995.

Lele et al., "2 db Better than CP-OFDM with OFDM/OQAM for Preamble-Based Channel Estimation", ICC 2008 Proceedings.

Lele et al., "Preamble-Based Channel Estimation Techniques for OFDM/OQAM Over the Powerline", Proceedings of the IEEE International Symposium on Power Line Communications and ITS Applications, Mar. 1, 2007.

Siohan et al., "Analysis and Design of OFDM/OQAM Systems Based on Filterbank Theory", IEEE Transactions on Signal Processing, vol. 50, No. 5, May 2002.

Y.H. Ma et al., "Performance Analysis of OFDM Systems for Broadband Power Line Communications Under Impulsive Noise and Multipath Effects" IEEE Transactions on Power Delivery, vol. 20, No. 2, Apr. 2005.

* cited by examiner

METHODS FOR TRANSMITTING AND RECEIVING A MULTICARRIER SIGNAL IMPLEMENTING PROTOTYPE FILTERS, CORRESPONDING DEVICES FOR TRANSMITTING AND RECEIVING, SIGNAL AND COMPUTER PROGRAM

CROSS-REFERENCE TO RELATED APPLICATIONS

This Application is a Section 371 National Stage Application of International Application No. PCT/FR2010/051189, filed Jun. 15, 2010, which is incorporated by reference in its entirety and published as WO 2010/146301 on Dec. 23, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of digital communications.

More specifically, the disclosure relates to the transmission and receiving of multicarrier signals having undergone OFDM/OQAM (Orthogonal Frequency Division Multiplexing/Offset Quadrature Amplitude Modulation) or BFDM/OQAM (Bi-orthogonal Frequency Division Multiplexing/OQAM) type modulation for which the carriers are shaped by a prototype filter and in which a preamble is inserted before transmission. In particular, the disclosure concerns the building of such prototype filters implemented in transmitters or receivers.

The disclosure applies to wired communications (xDSL, PLC, optical, etc) and to wireless communications (DAB, DVB-T, WLAN, non-guided optical communications, etc), implemented in the context of point-to-point (unicast) or multi-point-to-multi-point (multicast i.e. SISO or MIMO) transmissions. It can be noted that the disclosure is particularly well suited to power line carrier (PLC) transmission.

BACKGROUND OF THE DISCLOSURE

The techniques of multicarrier transmission have many advantages, especially in the context of wired or non-wired multipath channels.

Thus, OFDM type modulations are particularly well suited to countering the effects of fading in multipath channels. However, these OFDM modulations have the drawback of generating a signal with poor frequency localization.

Alternative solutions have then been proposed, leading to multicarrier modulation techniques in which the signal is shaped by filters (for a discretized signal) or functions (for a continuous signal) known as prototype filters, enabling better frequency localization through properties of orthogonality. These are for example OFDM/OQAM or BFDM/OQAM type modulations, conventionally used for radiofrequency communications as described especially in the patent application WO 2008/007019 published 17 Jan. 2008 on behalf of the present Applicant. It may be recalled that the OFDM/OQAM signal can be represented in discrete form, as follows:

$$s[k] = \sum_{m=0}^{M-1} \sum_{n \in \mathbb{Z}} a_{m,n} \underbrace{g[k-nN]e^{j\frac{2\pi}{M}m(k-\frac{D}{2})}e^{j\phi_{m,n}}}_{g_{m,n}[k]},$$

with:
$a_{m,n}$ being a real value data element to be transmitted on a carrier m at the instant n;
M the number of carrier frequencies;
g the prototype filter used by the modulator;
$D = L_g - 1$, with $L_g$ being the length of the prototype filter g:
$N = M/2$ being a discrete temporal shift;
$\phi_{m,n}$ being a phase term chosen so as to achieve a real part/imaginary part alternation enabling orthogonality or more generally bi-orthogonality, for example equal to $$\frac{\pi}{2}(n+m) + \phi_0,$$

with $\phi_0$ chosen arbitrarily; and
$j^2 = -1$.

However, one drawback of these OFDM/OQAM or BFDM/OQAM modulation techniques is that the condition of orthogonality or of bi-orthogonality is achieved only for real values of the data elements to be transmitted. Now, the fact of having available only an orthogonality of translated values in the real sense makes the process of channel estimation more difficult.

Indeed, to estimate the complex gain of the channel on a given carrier, it is appropriate to obtain the complex projection of the signal received on said carrier. Now, the fact that there is no guard interval and that the orthogonality is only real according to this type of modulation implies the presence of intrinsic intra-carrier or inter-carrier interference even on an ideal channel. Indeed, the imaginary part of the projection of the signal received on the basis of the translated values of the prototype filter is not zero. This is expressed by a disturbing term which gets added to the demodulated signal and which must be taken into account for the estimation of the channel.

In concrete terms, if the data element $a_{m,n}$ is sent at the frequency/time location (m,n), it can be shown that the following signal is obtained at reception without taking account of the noise:

$$y_{m,n}^{(c)} \approx H_{m,n}^{(c)}(a_{m,n} + ja_{m,n}^{(i)}),$$

where $H_{m,n}^{(c)}$ designates the channel coefficient and et $a_{m,n}^{(i)}$ designates the residual interference that persists around the symbol of index n and each carrier of the index m.

The approaches of estimation by preamble considered hitherto seek to optimize the structure of the preamble by producing either a preamble that can be used to cancel interference at reception as described in the patent application WO 02/25883 published on 28 Mar. 2002 or, on the contrary, a preamble that increases the power of this interference in reception as described in the patent application WO 2008/007019 mentioned here above.

This second approach, also called the IAM or Interference Approximation Method gives better results for the channel estimation. Indeed, for a given transmission power, the gain anticipated by this IAM approach increases in proportion to the imaginary interference generated for each data element transmitted. The increase in interference is therefore beneficial up to a certain point.

According to this second approach and as described in the patent application WO 2008/007019 mentioned here above, the receiver uses an approximation of the residual interference $a_{m,n}^{(i)}$. For example, if we consider a neighborhood sized 3×3, denoted as $\Omega^*_{1,1}$, around a frequency-time position $(m_0, n_0)$, in excluding the position $(m_0, n_0)$, the imaginary component $a_{m,n}^{(i)}$ can be approximated by:

$$a_{m_0,n_0}^{(i)} \approx \sum_{(p,q)\in\Omega^*_{1,1}} a_{m_0+p,n_0+q} \langle g \rangle_{m_0+p,n_0+q}^{m_0,n_0}$$

where $\langle g \rangle_{m_0+p,n_0+q}^{m_0,n_0}$ is equal to the scalar product of $g_{m_0,n_0}$ by $g_{m_0,n_0}$ by $g_{m_0+p,n_0+q}$.

In the presence of noise η, this leads to a channel estimation given by:

$$\hat{H}_{m_0,n_0}^{(c)} = H_{m_0,n_0}^{(c)} + \frac{\eta_{m_0,n_0}}{(a_{m_0,n_0} + ja_{m_0,n_0}^{(i)})}.$$

In order to amplify or boost the power of the preamble received, particular preamble structures have been proposed, such as the one known as IAM1 in C. Lélé, P. Siohan, R. Legouable, and J.-P. Javaudin, "*Preamble-based channel estimation techniques for OFDM/OQAM over the powerline*" (ISPLC 2007, March 2007).

For example, the sequence illustrated in FIG. 1 comprises:
a preamble IAM1 formed by three preamble symbols referenced $p_{m,0}$, $p_{m,1}$ and $p_{m,2}$, with m being the index for the carrier frequencies and 0, 1, 2 being the temporal index, each preamble symbol comprising M pilots for which the value and location at transmission are known to at least one receiver designed to carry out a reception of the multicarrier signal; and
data symbols.

The structure of the preamble IAM1 is such that:

$p_{m,0}=p_{m,2}=0$, $p_{4k,1}=p_{4k+1,1}=1$, and $p_{4k+2,1}=p_{4k+3,1}=-1$, with k=0, . . . , M/4−1 and M is the number of carriers per multicarrier symbol.

Consequently, the pilot received at the mth frequency and for the symbol $p_{m,1}$ with a temporal index 1 interference-ridden (also called a "pseudo-pilot") can be written as:

$b_{m,1} \approx p_{m,1} + j(2p_{m+1,1}\langle g \rangle_{m+1,1}^{m,1})$ where $\langle g \rangle_{m+1,1}^{m,1}$ corresponds to the scalar product of the filters $g_{m+1,1}[k]$ and $g_{m,1}[k]$.

In denoting $|\langle g \rangle_{m+1,1}^{m,1}|=\beta_0$, then the power of the pseudo-pilot can be expressed in the following form:

$E[|b_{m,1}|^2]=2\sigma_a^2(1+4\beta_0^2)$, where $\sigma_a^2$ corresponds to the variance of the data elements $a_{m,n}$.

Other preamble structures of a same length (three preamble symbols i.e. 3M pilots) have also been proposed, leading to even more favorable expressions for the power of the pseudo-pilot as proposed in the document C. Lélé, P. Siohan, and R. Legouable, "*2 db better than CP-OFDM with OFDM/OQAM for preamble-based channel estimation*" (ICC 2008, May 2008).

It can be observed that in all these cases, the quality of the channel is directly related to parameter $\beta_0$. Thus, the best results (i.e. the highest values of the parameter $\beta_0$ are obtained with orthogonal filters that are well localized in time and frequency.

Thus, the classically used prototype filters use the IOTA (Isotropic Orthogonal Transform Algorithm) function, discretized and truncated to a length 4M, or the prototype filter of length M called the TFL (Time Frequency Localization) filter optimized for a defined criterion, for a signal with real values, by a time/frequency localization parameter:

$$\xi = \frac{1}{4\pi\sqrt{m_2 M_2}},$$

where $m_2$ and $M_2$ are respectively the second-order moments in time and frequency defined in the document by M. I. Doroslovački, "*Product of second moments in time and frequency for discrete time signals and the uncertainty limit*" (*Signal Processing*, vol. 67), such that:

$$m_2(x) = \frac{1}{\|x\|^2}\sum_{k\in\mathbb{Z}}\left(k-\frac{1}{2}-T(x)\right)^2\left[\frac{x[k]+x[k-1]}{2}\right]^2$$

$$M_2(x) = \frac{1}{(2\pi)^2\|x\|^2}\sum_{k\in\mathbb{Z}}[x[k]-x[k-1]]^2$$

with:

$$T(x) = \frac{\sum_{k\in\mathbb{Z}}\left(k-\frac{1}{2}\right)[x[k]+x[k-1]]^2}{\sum_{k\in\mathbb{Z}}[x[k]+x[k-1]]^2}.$$

It can be noted that the time-frequency localization ξ of a discrete signal has an upper limit $\xi \leq 1$.

All these techniques permit to obtain preamble structures that increase the power of the "pseudo-pilot" and therefore increase the level of interference produced at reception. The carriers of the preamble are then shaped by using orthogonal or bi-orthogonal prototype filters classically used in OFDM/OQAM or BFDM/OQAM modulations respectively.

Unfortunately, one drawback of this approach of estimation by preamble aimed at producing a preamble that increases the power of the interference at reception is that it does not guarantee, for a given preamble structure, that a "pseudo-pilot" of maximum energy will be obtained.

Furthermore, the fact of having available orthogonality in the real sense makes the channel estimation process more difficult.

There is therefore a need for a novel technique for transmitting and/or receiving a multicarrier signal comprising a preamble that has undergone an OFDM/OQAM or BFDM/OQAM type modulation that can be used to remedy at least some of these drawbacks and especially accurately estimate the transmission channel.

SUMMARY

An illustrative embodiment of the invention relates to a method for transmitting a multicarrier signal formed by a temporal succession of multicarrier symbols comprising:

at least one preamble formed by at least three consecutive multicarrier symbols, known as preamble symbols, carrying complex-value data elements each associated with a carrier of said signal, and multicarrier symbols, called data symbols, carrying real-value data elements each associated with a carrier of said signal, and characterized in that said method for transmitting comprises a step for shaping said carriers, implementing:

a filtering, by a first prototype filter, of the carriers carrying said complex-value data elements, corresponding to said preamble symbols, enabling said preamble symbols to be shaped, and a filtering, by a second prototype filter, distinct from said first prototype filter, of the carriers carrying said real-value data elements corresponding to said data symbols, enabling said data symbols to be shaped.

Thus, an embodiment of the invention is situated in the context of transmitting multicarrier signals comprising a preamble, for which the carriers are shaped by prototype filters, of the OFDM/OQAM or BFDM/OQAM type for example.

It may be recalled that, in this context, the data signals carry real-value data elements. Thus, the spectral efficiency of OFDM/OQAM is identical to that of the classic OFDM without any guard interval. Indeed, if $v_0$ denotes the spacing between two adjacent carriers of the multiplex, and $\tau_0$ denotes the temporal spacing between two real-value data elements, the following are transmitted for a same inter-carrier spacing $v_0$:

in OFDM/OQAM, a real-value per carrier at every time slot $\tau_0$;

in classic OFDM without guard interval, a complex value (i.e. two real values) every $2 \times \Sigma_0$.

According to an embodiment of the invention, it is then possible to use distinct prototype filters for the shaping of the preamble symbols and the data symbols.

In particular, the preamble symbols can be shaped by an unspecified first prototype filter, i.e. one that is not necessarily orthogonal or bi-orthogonal.

In this way, the constraint of orthogonality in the real sense for the symbols of the preamble, which, in the prior art, limited the choice of prototype filters, no longer applies. On the contrary, the first prototype filter is not necessarily orthogonal.

The data symbols for their part are classically shaped by means of a second orthogonal or bi-orthogonal prototype filter of the IOTA or TFL type for example. This means that the values translated in the time/frequency space of the second prototype filter are mutually orthogonal or bi-orthogonal, thus enabling an improved frequency localization of the multicarrier signal.

Thus, two distinct prototype filters are used, one for the preamble, determined so as to obtain an efficient estimation of the transmission channel, and the other for the orthogonal or bi-orthogonal payload data to ensure efficient transmission of the payload.

Indeed, the inventors have noted that the prior-art solutions which use a unique prototype filter chosen as a function of the criteria related to the transmission of the payload data and not to the channel estimation do not necessarily lead to the best channel estimation. The role of the prototype filter is therefore not negligible for obtaining an efficient channel estimation.

According to one particular aspect of an embodiment of the invention, the preamble comprises two end preamble symbols constituted by data elements carrying a zero value, framing at least one central preamble symbol consisting of pilots $p_i$ carrying a value equal to à 1 or −1, with i∈[0,M−1] the index of the carrier associated with the pilot $p_i$ and M the number of carriers associated with the central preamble symbol such that, for k=0, . . . , M/4−1:

$p_{4k}=p_{4k+1}=1$ and $p_{4k+2}=p_{4k+3}=-1$.

This particular preamble structure, also called IAM1 and described with reference to the prior art, makes it possible especially to increase the residual interference at reception. Combined with a shaping by a prototype filter that is not necessarily orthogonal (first prototype filter) such a structure makes it possible to simplify and improve the performance of the channel estimation process implemented at reception.

According to one variant, the preamble includes at least one pilot carrying a pure imaginary value.

Naturally, the number of preamble symbols can be greater than or equal to three. However, a preamble having three multicarrier symbols is considered to be the most efficient for the channel estimation.

According to one particular embodiment of the invention, the first prototype filter g[k] takes the following discrete form:

$$g[k] = \frac{F(0)}{2^K} \frac{\Gamma(K+1)}{\Gamma(K/2+1-k \cdot T_r)\Gamma(K/2+1+k \cdot T_r)}$$

with:

K=$L_g$−1, with $L_g$ being the length of said first prototype filter;

F(0) a constant;

Γ(•) being the gamma function; and $T_r$ being a temporal resolution parameter.

The gamma function is well known to those skilled in the art. For integers k∈ $\mathbb{Z}$, it is expressed as follows:

$[\Gamma(k)]^{-1}=0$ for k≤0;

$\Gamma(k)=(k-1)!$ for k~0 and k∈ $\mathbb{N}$, with ! being the factor operator.

This first prototype filter is used solely for the duration of transmission of the preamble and is determined so as to obtain an efficient estimation of the transmission channel. It is not necessarily orthogonal or bi-orthogonal but maximizes the parameter $\beta_0$ defined with reference to the prior art, also called a first parameter.

In particular, this first prototype filter is well localized in the time and frequency domain and guarantees that the approximation given by the equation $$a_{m_0,n_0}^{(i)} \approx \sum_{(p,q)\in\Omega_{1,1}^*} a_{m_0+p,n_0+q} \langle g \rangle_{m_0+p,n_0+q}^{m_0,n_0} \text{ is valid.}$$

According to a first variant, the method of transmitting comprises a step for determining the temporal resolution parameter $T_r$ of the first prototype filter g[k], on the basis of a first parameter $\beta_0$ and a second parameter $\beta_I$, such that:

$$-\beta_0 = \left| \sum_k g^2[k] \cos\left(2\pi \frac{k}{M}\right) \right| \text{ and}$$

$$-\beta_I = \left| \sum_p j^p \sum_k g^2[k] \cos\left(2\pi \frac{pk}{M}\right) \right|,$$

with $j^2=-1$, M being the number of carriers per multicarrier symbol and $L_g$=M.

According to this first variant, the determining step maximizes the first parameter $\beta_0$ and/or minimizes the second parameter $\beta_I$.

According to a second variant, the method for transmitting comprises a step for determining the temporal resolution parameter $T_r$ of the first prototype filter g[k], on the basis of a linear combination of a first parameter $\beta_0$ and a second parameter $\beta_I$, equal to $w\beta_0-(1-w)\beta_I$,
such that:
w is a weighting factor such that $0 \le w \le 1$;

$$-\beta_0 = \left| \sum_k g^2[k]\cos\left(2\pi\frac{k}{M}\right) \right|; \text{ and}$$

$$-\beta_I = \left| \sum_p j^p \sum_k g^2[k]\cos\left(2\pi\frac{pk}{M}\right) \right|;$$

with $j^2=-1$, M being the number of carriers per multi-carrier symbol and $L_g=M$.

According to this second variant, the determining step maximizes the linear combination, $w\beta_0-(1-w)\beta_I$.

Another aspect of an embodiment of the invention concerns a computer program comprising instructions for implementing the method for transmitting as described here above, when said program is executed by a processor.

It can be noted indeed that the method of an embodiment of the invention can be implemented in various ways, especially in wired form or in software form.

In another embodiment, the invention pertains to a device for transmitting a multicarrier signal formed by a temporal succession of multicarrier symbols comprising:
at least one preamble formed by at least three consecutive multicarrier symbols, known as preamble symbols, carrying complex-value data elements each associated with a carrier of said signal, and
multicarrier symbols, called data symbols, carrying real-value data elements each associated with a carrier of said signal.

According to an embodiment of the invention, the device for transmitting comprises means for shaping the carriers, comprising:
a first prototype filter filtering the carriers carrying said complex-value data elements, corresponding to said preamble symbols, enabling said preamble symbols to be shaped, and
a second prototype filter, distinct from said first prototype filter, filtering the carriers carrying said real-value data elements corresponding to said data symbols, enabling said data symbols to be shaped.

Such a device for transmitting is especially suited to implement the method for transmitting described here above. It is for example the transmitter of a transmission/reception pair or a PLC modem.

This device could of course comprise the different characteristics pertaining to the method for transmitting according to an embodiment of the invention.

An embodiment of the invention also pertains to a multicarrier signal formed by a temporal succession of multicarrier symbols, comprising:
at least one preamble formed by at least three consecutive multicarrier symbols, known as preamble symbols, carrying complex-value data elements each associated with a carrier of said signal, and
multicarrier symbols, called data symbols, carrying real-value data elements each associated with a carrier of said signal.

According to an embodiment of the invention, the carriers carrying the complex-value data elements corresponding to the preamble symbols of such a signal are shaped by a first prototype filter, and the carriers carrying the real-value data elements corresponding to the data symbols are shaped by a second prototype filter distinct from the first prototype filter.

Such a signal can be sent especially by the method for transmitting described here above. This signal could of course comprise the different characteristics pertaining to the method for transmitting according to an embodiment of the invention.

Another aspect of an embodiment of the invention pertains to a method for receiving a multicarrier signal formed by a temporal succession of multicarrier symbols comprising, at transmission:
at least one preamble formed by at least three consecutive multicarrier symbols, known as preamble symbols, carrying complex-value data elements each associated with a carrier of said signal, and
multicarrier symbols, called data symbols, carrying real-value data elements each associated with a carrier of said signal.

According to an embodiment of the invention, such a method for receiving comprises a step for shaping received carriers, implementing:
a filtering of the received carriers associated with the preamble symbols by a first prototype filter, and
a filtering of the received carriers associated with the data symbols by a second prototype filter, distinct from said first prototype filter.

It can be noted that, because of the passage into the transmission channel, the data elements undergo interference (inter-carrier or intra-carrier interference). Thus, the data elements which had a real value on the transmission side can show a complex value on the reception side.

Such a method for receiving is especially suited to receiving a multicarrier signal sent according to the method for transmitting described here above.

The characteristics and advantages of this method for receiving are the same as those of the method for transmitting. Consequently, they shall not be described in greater detail.

In particular, the first prototype filter implemented at reception is identical to the first prototype filter implemented at transmission. Indeed, to be able to carry out the channel estimation, the receiver must perfectly know the values and locations of the data elements of the preamble symbols.

The second prototype filter implemented at reception for its part is not necessarily identical to the second prototype filter implemented at transmission.

An embodiment of the invention also pertains to the building of prototype filters implanted in the transmitters and the receivers.

Another aspect of an embodiment of the invention pertains to a computer program comprising instructions for the implementation of the method for receiving as described here above as executed by a processor.

It can be noted indeed that the method of an embodiment of the invention can be implemented in various ways, especially in wired form or in software form.

In another embodiment, the invention concerns a device for receiving a multicarrier signal formed by a temporal succession of multicarrier symbols, comprising at transmission:

at least one preamble formed by at least three consecutive multicarrier symbols, known as preamble symbols, carrying complex-value data elements each associated with a carrier of said signal, and multicarrier symbols, called data symbols, carrying real-value data elements each associated with a carrier of said signal.

According to an embodiment of the invention, such a device for receiving comprises means for shaping the carriers, comprising:

a first prototype filter filtering the received carriers associated with the preamble symbols, and a second prototype filter, distinct from the first prototype filter, filtering the received carriers associated with the data symbols.

Such a device for receiving is especially suited to implement the method for receiving described here above. It is for example the receiver of a transmission/reception pair or a PLC modem, or a set top box etc.

This device could of course comprise the different characteristics of the reception method according to an embodiment of the invention.

BRIEF DESCRIPTION OF THE DRAWINGS

Other features and advantages shall appear more clearly from the following description of a particular embodiment, given by way of a simple illustrative and non-exhaustive example and from the appended figures, of which.

DETAILED DESCRIPTION OF ILLUSTRATIVE EMBODIMENTS

1. General Principle

The general principle of an embodiment of the invention relies on a specific shaping of the carriers of a multicarrier signal comprising at least one preamble, formed by at least three preamble symbols, and data symbols. Such a preamble is for example placed at the beginning of a frame, a frame being constituted by at least one preamble symbol and one set of data symbols.

This specific shaping of the carriers consists in applying a distinct prototype filter (for a discrete signal) or one prototype function (for a continuous signal) to the carriers corresponding to the preamble symbols and to the data symbols. These prototype filters can be implanted in a transmitter and in a corresponding receiver.

Thus, according to an embodiment of the invention, a first prototype filter (or prototype function) is used, dedicated solely to the transmission of the preamble (preamble symbols) that is not necessarily orthogonal and that enables an increase in the level of interference produced at reception as compared with the prior-art techniques.

A second prototype filter (or prototype function) is used for the transmission of payload data (data symbols) which for its part is orthogonal, and enables a better frequency localization of the data symbols of the multicarrier signal.

The use of these two distinct prototype filters makes it possible especially to improve the estimation of the transmission channel and therefore improve the transmission gains.

2. Applications to OFDM/OQAM Modulations

Here below, a description is given of an example of implementation of an embodiment of the invention in the context of an OFDM/OQAM modulation for which the preamble symbols are inserted at output of a modulation step. It can be noted that these preamble symbols could also be inserted into the signal before the modulation step. Naturally, an embodiment of the invention can be applied to any transmission system implementing multicarrier modulation for which the carriers are shaped by a prototype function, and an estimation of the channel by preamble.

Figure 2A:
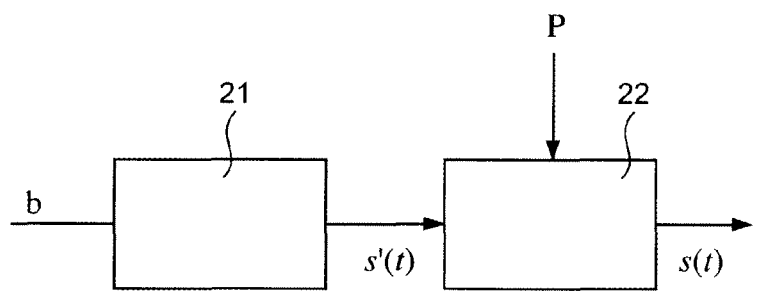
FIGS. 2A and 2B show the main steps implemented for a OFDM/OQAM transmission implementing two distinct prototype functions according to one embodiment of the invention.

More specifically, as illustrated in FIG. 2A, the method of transmission according to one particular embodiment of the invention comprises a classic step of OFDM/OQAM modulation enabling the delivery of a multicarrier signal s'[k] comprising a set of data symbols, from initial payload data in binary form denoted as b.

For example, this modulation step 21 comprises the usual operations: conversion of the payload data b into complex-value data elements, decomposition of the complex-value data elements into real value data elements $a_{m,n}$ (corresponding to the real and imaginary components of complex-value data element), phase and amplitude correction (implementing a complex multiplication making it possible to take account of a specific phase term and the length of the prototype filter used for the payload data, denoted as a second prototype filter), passage from the frequency domain to the time domain by means of an inverse Fourier transform, implementation of the second prototype filter in its form known as the polyphase form.

In other words, the carriers carrying the real-value data elements $a_{m,n}$, corresponding to the data symbols are shaped by the second prototype filter.

For example, the second prototype function is the IOTA function or the TFL function or any other prototype function having properties of orthogonality.

After a parallel/series conversion, we obtain at output of the modulator the OFDM/OQAM signal denoted as s'[k] in discrete form, or s'(t) in continuous form after passage in a digital/analog converter.

The process of transmission according to one particular embodiment of the invention also comprises a preamble insertion step 22. Classically, such a preamble is inserted into a frame before the data symbols.

Such a preamble is formed by at least three preamble symbols each carrying complex-value data elements (the term "complex" is also understood herein to mean a purely real value or purely imaginary value). The carriers carrying the complex-value data elements $c_{m,n}$, corresponding to these preamble symbols, are shaped by a first prototype filter, distinct from the second prototype filter.

For example, this first prototype filter g[k], also called a modified Doroslovački filter, takes the following discrete form:

$$g[k] = \frac{F(0)}{2^K} \frac{\Gamma(K+1)}{\Gamma(K/2+1-k \cdot T_r)\Gamma(K/2+1+k \cdot T_r)}$$

with:
K=$L_g$−1, with $L_g$ being the length of the first prototype filter;
F(0) a constant;
Γ(•) a gamma function; and
$T_r$ a temporal resolution parameter.

Such a filter used for the transmission of the preamble is not necessarily orthogonal.

The multicarrier signal in discrete form is denoted s[k] (or s(t) in continuous form) and is obtained after insertion of the preamble.

Figure 2B:
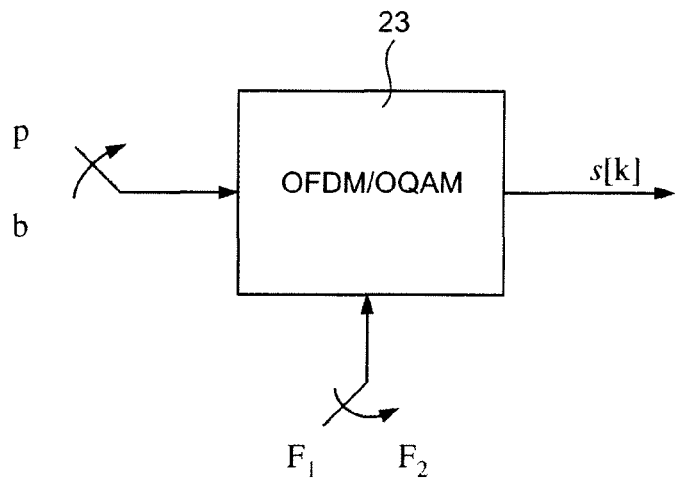

FIG. 2B illustrates another example of implementation of the method for transmitting according to one particular embodiment of the invention.

We thus consider an OFDM/OQAM modulator 23 used to deliver a multicarrier signal s[k] formed by multicarrier symbols of a duration $\tau_0$. For example, a frame of such a signal s[k] comprises three preamble symbols on three first periods ($[0,3\tau_0]$) and data symbols on the following periods ($[4\tau_0, \ldots]$).

The OFDM/OQAM modulator 23 implements the classic steps of inverse Fourier transform and prototype filtering.

However, according to an embodiment of the invention, the coefficients of the prototype filter of such an OFDM/OQAM modulator are:
either those of any unspecified first prototype filter $F_1$, for example a modified Doroslovački filter, used to shape the three preamble symbols on the first three periods ($[0,3\tau_0]$) from the preamble data p,
or those of a second orthogonal prototype filter $F_2$, for example an IOTA or TFL filter, used to shape the data symbols on the following periods ($[4\tau_0, \ldots]$) from the payload data b.

Such an OFDM/OQAM modulator therefore makes it possible to switch over from a first filter $F_1$ to a second filter $F_2$ (and then if need be switch back to the first filter and so on and so forth if several preambles are inserted into the multicarrier signal) to modulate firstly the preamble data p and secondly the payload data b.

Figure 3:
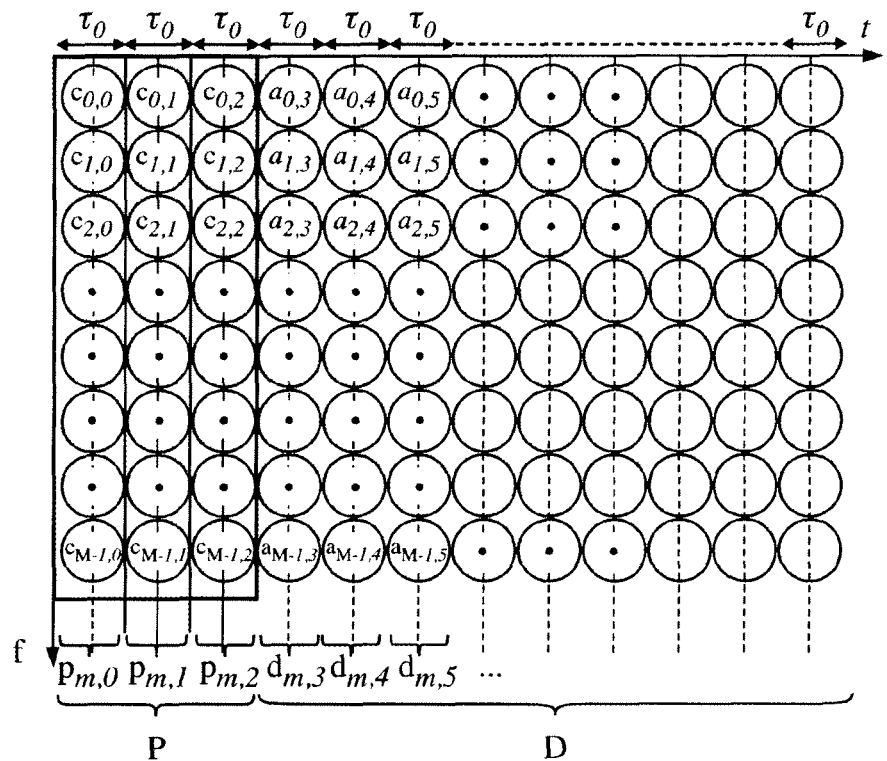
FIG. 3 illustrates the structure of a multicarrier signal according to an embodiment of the invention.

FIG. 3 is a more precise illustration of the structure of a frame of the signal s'[k] comprising a temporal succession of multicarrier symbols each having a duration $\tau_0$, comprising:
at least one preamble P, formed by at least three preamble symbols $p_{m,0}, p_{m,1}, p_{m,2}$ comprising complex-value data elements $c_{m,n}$, each associated with the carrier of the signal, and
data elements D comprising data symbols $d_{m,3}, d_{m,4}, d_{m,5}$, etc, comprising real-value data elements $a_{m,n}$ each associated with a carrier of the signal,
where the index m corresponds to the frequency index of the carrier, and the index n corresponds to the temporal index.

The data elements of the preamble symbols are also called pilots, their value and location at transmission being known to at least one receiver that is to carry out a reception of the multicarrier signal. It may be recalled indeed that, within the context of an estimation by preamble, the receiver must know the exact content of the preamble, i.e. the position of the pilots in the time/frequency space and their value.

Substantially identical steps are implemented on the reception side.

Figure 4:
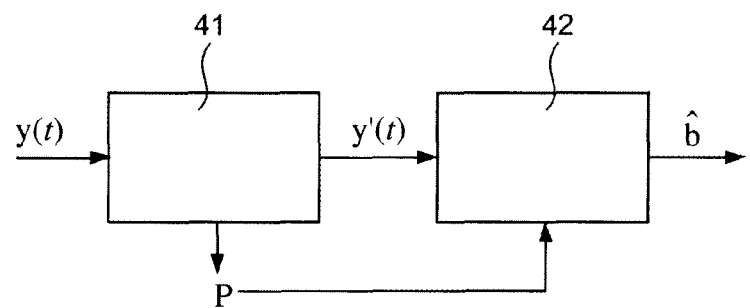
FIG. 4 presents the main steps implemented for an OFDM/OQAM reception implementing two distinct prototype functions, according to one embodiment of the invention.

More specifically, as illustrated in FIG. 4, the method for receiving according to one particular embodiment of the invention comprises, at reception of the multicarrier signal after passage in the transmission channel denoted as y(t), a step 41 for extracting the preamble P used to separate the preamble symbols received from the data symbols received.

The preamble symbols received are then again shaped by the first prototype filter. In other words, the prototype filters used for the transmission of the preamble (applied to the preamble symbols) and therefore for the estimation part of the channel are identical at transmission and at reception.

The data symbols received for their part undergo different processing operations. More specifically, according to this particular embodiment, the method for receiving comprises a classic OFDM/OQAM demodulation step 42, implementing an estimation of the transmission channel from the preamble P and making it possible to obtain an estimation of the initial payload data in binary form, denoted as $\hat{b}$, from the data symbols received and the estimation of the transmission channel.

For example, this demodulation step 42 comprises the usual operations of estimation of the transmission channel from the preamble P, the filtering of the data symbols received by the second prototype function, the passage from the time domain to the frequency domain by means of a direct Fourier transform, phase and amplitude correction (implementing a complex multiplication making it possible to take account of a specific phase term and the length of the second prototype filter), extraction of the real part and recombination of the real data in sets of two to form a piece of complex data and rebuild the payload data $\hat{b}$.

It may be recalled that during an estimation of the channel in OFDM/OQAM in a preamble, the transmitter and the receiver know the data elements of the preamble (pilots) and the prototype filter used at transmission and, through the equation used to approximate the imaginary component corresponding to the interference obtained at a time/frequency location $$\text{(for example } a_{m_0,n_0}^{(i)} \approx \sum_{(p,q) \in \Omega_{1,1}^*} a_{m_0+p,n_0+q} \langle g \rangle_{m_0+p,n_0+q}^{m_0,n_0}$$

as described with reference to the prior art), it is possible to make a receiver obtain an estimate of the transmission channel. A technique of estimating the channel by preamble is described especially in the document WO2008/007019 mentioned here above.

The channel may thus be estimated on each of the carriers of the multiplex. The choice of the parameters of the system (symbolic duration, frame length etc) ensures that the channel varies slowly relatively to the symbol time $\tau_0$. It is then assumed that the channel is almost constant on a frame (where a frame is constituted by at least one preamble symbol and a set of data symbols). It is then possible to use the determined estimate of the channel for the preamble symbol or symbols for all the data symbols of the frame.

It can be noted that according to this embodiment, the prototype filters used for the transmission of the data (applied to the data symbols) and therefore for the payload part are identical at transmission and at reception, for example in the case of an OFDM/OQAM transmission implementing a linear phase filter. However, this characteristic is not obligatory and the filters used in transmission and in reception for the payload can be different, for example in the case of BFDM/OQAM transmission.

Finally, as already illustrated on the transmission side, the steps of polyphase filtering and Fourier transform can be implemented in an OFDM/OQAM demodulator.

According to an embodiment of the invention, the coefficients of the prototype filter of such an OFDM/OQAM demodulator are either those of any unspecified first prototype filter $F_1$ (for example a modified Doroslovački filter) used to reshape the three preamble symbols on the first three periods ($[0,3\tau_0]$), or those of a second orthogonal prototype filter $F_2$ (for example an IOTA or TFL filter), enabling the data symbols to be reshaped on the following periods ($[4\tau_0, \ldots]$).

An OFDM/OQAM demodulator of this kind therefore makes it possible to switch over from a first filter $F_1$ to a second filter $F_2$ (and if necessary to switch back to the first filter and so on and so forth if several preambles are inserted into the multicarrier signal) to demodulate firstly the symbols of the preamble and secondly the data symbols.

3. Building of the First Prototype Filter

Here below, we present a particular embodiment for the determining of a prototype function well suited to the OFDM/OQAM modulations.

In this particular embodiment, we consider a preamble presenting the IAM1 structure described with reference to the prior art and illustrated in FIG. 1.

More specifically, a preamble in this example is formed by two end symbols formed by data elements each carrying a zero value and a central symbol formed by pilots $p_i$ carrying a value equal to 1 or −1, with $i \in [0,M-1]$ the index of the carrier associated with the pilot $p_i$ and M the number of carriers associated with the central symbol, such that, for $k = 0, \ldots, M/4-1$:

$$p_{4k} = p_{4k+1} = 1 \text{ and}$$

$$p_{4k+2} = p_{4k+3} = -1.$$

A preamble such as this therefore has a duration of $3\tau_0$.

The equations presented with reference to the prior art therefore apply again.

It can be noted that other preamble structures can also be used according to an embodiment of the invention, such as those proposed in the document "*2 db better than CP-OFDM with OFDM/OQAM for preamble-based channel estimation*" cited here above.

In particular, it can be noted that it is possible to use preamble sequences comprising pilots of pure imaginary value. Indeed, the strict orthogonality or bi-orthogonality of the preamble symbols is not an indispensable condition for making an accurate estimation of the transmission channel.

The above-cited document "*Product of second moments in time and frequency for discrete time signals and the uncertainty limit*" by M. I. Doroslovački proposed a discrete filter that is optimal from the viewpoint of time/frequency localization, in the form:

$$\gamma[k] = \frac{F(0)}{2^K} \frac{\Gamma(K+1)}{\Gamma(K/2+1-k)\Gamma(K/2+1+k)}$$

for any value whatsoever of K, such that K>½, where:
F(0) is a constant, for example equal to 1;
$\Gamma(\cdot)$ is a gamma function.

According to this document, this discrete time filter tends towards the Gaussian function when $K \to +\infty$. Furthermore, this filter can be used to reach the upper limit of time/frequency localization ($\xi=1$).

It is proposed according to this particular embodiment to modify this classic filter to obtain the prototype filter used for the transmission of the preamble, also called the first prototype filter. The operation is situated in the case where $K = L_g - 1$, with $L_g$ being the length of the first prototype filter.

In order to prevent interference with the payload to be transmitted (data symbols), we assume $L_g = M$, with M being the number of carriers per multicarrier symbol. A temporal resolution parameter $T_r$ is also introduced so as to obtain the first prototype filter:

$$g[k] = \frac{F(0)}{2^K} \frac{\Gamma(K+1)}{\Gamma(K/2+1-k \cdot T_r)\Gamma(K/2+1+k \cdot T_r)}$$

The use of such a temporal resolution parameter $T_r$ makes it possible to weight the temporal localization and the frequency localization of the prototype filter. In other words, this parameter $T_r$ permits to modify the temporal resolution and favors either the temporal localization or the frequency localization.

Thus, for $T_r=1$, the conventional Doroslovački filter is obtained.

Figure 5A:
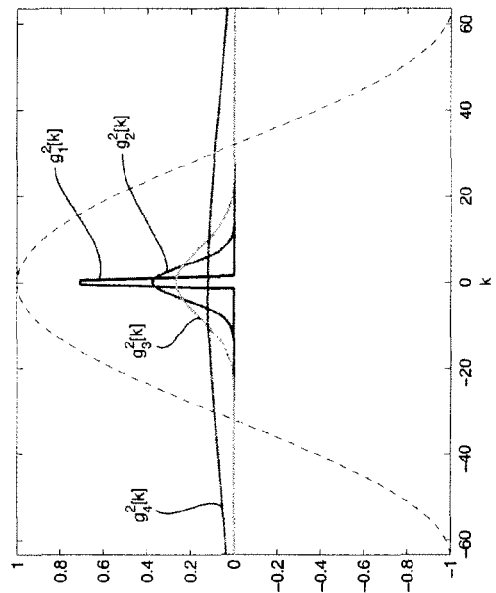
FIGS. 5A to 5C illustrate the pulse response of the prototype filter g[k] or $g^2$[k] for different values of the temporal resolution parameter $T_r$, as well as the associated interference masks.

In causing $T_r$ ($T_r<1$) to decrease, the moment of order 2 in time $m_2$ will increase but the moment of order 2 in frequency $M_2$ will decrease. FIG. 5A thus illustrates the pulse response of the prototype filter g[k] for different values of the temporal resolution parameter $T_r$.

It is then sought to find the optimal value of the temporal resolution parameter $T_r$ of the first prototype filter enabling a first parameter $\beta_0$ to be optimized. The temporal resolution parameter $T_r$ makes it possible especially to weight the need for an efficient time/frequency good localization and the need for obtaining high values of $\beta_0$.

In other words, a prototype filter is sought, dedicated solely to the transmission of the preamble, that approaches the ideal prototype filter to carry out an accurate estimation by preamble in OFDM/OQAM. From a mathematical viewpoint, this amounts to finding the shortest possible support function (in order to avert the creation of interference with payload data), and of which a parameter denoted as $\beta_0$ linked to the ambiguity function has the greatest possible value.

In expressing this first parameter $\beta_0$ as a function of the prototype filter g[k], we obtain:

$$\langle g \rangle_{m+1,1}^{m,1} = \sum_{k \in \mathbb{Z}} g_{m,1}[k] g_{m+1,1}^*[k] = j A_g[0,1]$$

where * corresponds to the conjugate operator and $A_g[\tau,\mu]$ is the ambiguity function given by:

$$A_g[\tau, \mu] = \sum_{k \in \mathbb{Z}} g[k+\tau/2] g^*[k-\tau/2] e^{j2\pi \frac{\mu k}{M}}$$

consequently, $A_g[0,1]$ can also be written as:

$$A_g[0,1] = \sum_{k \in \mathbb{Z}} g^2[k] e^{j2\pi \frac{k}{M}} = \sum_{k \in \mathbb{Z}} g^2[k] \cos\left(2\pi \frac{k}{M}\right)$$

if we consider that the prototype function associated with the filter g[k] is a real and even-parity function.

In choosing a filter length equal to M, it is possible to express the first parameter $\beta_0$ by:

$$\beta_0 = |jA_g[0,1]| = \left|\sum_k g^2[k] \cos\left(2\pi \frac{k}{M}\right)\right|.$$

It is then sought to maximize this first parameter $\beta_0$ which amounts to maximizing the term $$\left|\sum_k g^2[k] \cos\left(2\pi \frac{k}{M}\right)\right|.$$

Figure 5B:
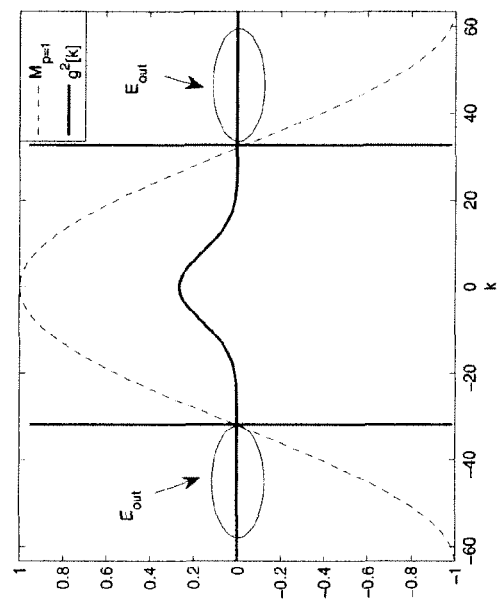

Furthermore, since the length of the prototype filter is equal to M, the term $$\cos\left(2\pi \frac{k}{M}\right)$$

corresponds to a period of the cosine mask, illustrated in dashes in FIG. 5B for p=1.

More specifically, FIG. 5B illustrates four instances, denoted as $g_i^2[k]$, of the square of the prototype filter $g^2[k]$, i.e. different possible forms of the square of the prototype filter $g^2[k]$ depending on the value of the temporal resolution parameter $T_r$. For example, the function $g_1^2[k]$ corresponds to the square of a conventional Doroslovački filter for which $T_r$=1. The functions $g_2^2[k]$, $g_3^2[k]$ and $g_4^2[k]$ correspond to the square of the modified Doroslovački filters for different temporal resolution parameters Tr, chosen quasi-arbitrarily so as to verify $Tr(g_1^2[k]) > Tr(g_2^2[k]) > Tr(g_3^2[k]) > Tr(g_4^2[k])$. For example $Tr(g_2^2[k])=0.5$, $Tr(g_3^2[k])=0.25$, and $Tr(g_4^2[k])=0.125$.

This FIG. 5B can be used to visualize the impact of a greater or smaller spread of the prototype function g on the first parameter $\beta_0$, which corresponds to the sum of the products $g^2[k]$ and $$\cos\left(2\pi \frac{k}{M}\right).$$

If we choose the function $g_1^2[k]$ for the first prototype filter, it can be seen that we obtain the maximum value of the first parameter $\beta_0$ because the entire energy of the pulse response of the filter is concentrated in proximity to the peak of the cosine mask (in dashes). On the contrary, if the energy gets dispersed to a greater extent depending on the index k, the value of the first parameter $\beta_0$ tends to decrease. In the extreme case of the function $g_4^2[k]$, the energy of the pulse response of the filter reaches even the negative zone of the cosine mask, which has the effect of appreciably reducing the value of the first parameter $\beta_0$.

However, if a narrowest possible function $g^2[k]$ is chosen, the interference is greatly increased. Now, if the interference becomes excessive then the approximation $b_{m,1} \approx p_{m,1} + j(2p_{m+1,1} \langle g \rangle_{m+1,1}^{m,1})$, as introduced with reference to the prior art is no longer valid.

It can be noted that the interference term is predominant on the frequency axis. It is therefore related to $\langle g \rangle_{m+p,1}^{m,1}$ for $|p|>1$.

After computation, we obtain $\langle g \rangle_{m+p,1}^{m,1} = j^p A_g[0,p]$, with $j^2 = -1$.

We also introduce a second parameter denoted as $\beta_I$, corresponding to the interference and such that:

$$\beta_I = \left|\sum_p j^p A_g[0,p]\right| = \left|\sum_p j^p \sum_k g^2[k] \cos\left(2\pi \frac{pk}{M}\right)\right|$$

for p=±2, ±3, . . . .

In the same way as in the case of the first parameter $\beta_0$, we obtain an interference mask cos $$\cos\left(2\pi \frac{pk}{M}\right).$$

Figure 5C:
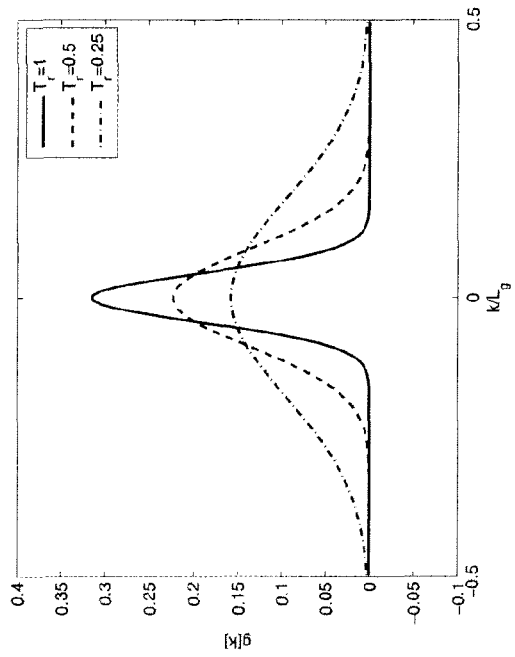

FIG. 5C takes up the curves of FIG. 5B again as well as examples of availability of this cosine mask for different values of p: $M_{p=1}$, $M_{p=2}$ and $M_{p=3}$.

It is clear that, if the square of the prototype function $g^2[k]$ has a narrow form such as $g_1^2[k]$, then the first parameter $\beta_0$, is effectively maximized but at the same time the second interference parameter $\beta_I$ is maximized.

Consequently, even when amplifying or boosting the power of the pseudo-pilot to the maximum, it is not possible to obtain an efficient estimation of the transmission channel because the above-mentioned approximation $b_{m,1} \approx p_{m,1} + j(2p_{m+1,1} \langle g \rangle_{m+1,1}^{m,1})$ is not valid.

On the other hand, if it is chosen to minimize the second interference parameter $\beta_I$, in spreading the energy of the filter over a range of indices k of greater importance, the value of the first parameter $\beta_0$ decreases too. It is therefore necessary to find a compromise for the time resolution parameter $T_r$.

To retain a value of the first parameter $\beta_0$ that is sufficiently high, it is necessary to keep the major part of the energy of the square of the prototype function $g^2[k]$ in the positive zone of the cosine mask for p=1 (denoted as $M_{p=1}$), as illustrated in FIG. 5C. It is possible at the same time to sufficiently spread the square of the prototype function $g^2[k]$. Since the cosine mask for the second parameter $\beta_I$ becomes denser, which means that there are more cosine periods in the mask, its negative parts will have the effect of reducing the second parameter $\beta_I$.

In short, the determining of the prototype filter used for the transmission of the preamble consists in seeking a temporal resolution parameter $T_r$ that makes it possible to obtain a prototype filter that is well localized in time and frequency, where the first and second parameters $\beta_0$ and $\beta_I$ can be seen as its localizing parameters.

As already indicated, the Doroslovački filter is optimal according to the time/frequency localization criterion. It is therefore sought to modify this filter by determining a temporal resolution parameter $T_r$ that can be used to obtain an appropriate compromise between a first and second parameter between $\beta_0$ and $\beta_I$.

According to a first variant, also called the MOE or Maximum Outside Energy (i.e. maximization of the energy outside the positive part of the mask, for p=1), it is sought to maximize the first parameter $\beta_0$ and minimize the second parameter $\beta_I$.

More specifically, it is sought to obtain a function $g^2[k]$ that is as narrow as possible, but also the most widespread so as to keep the major part of the energy of the function $g^2[k]$ in the positive zone of the cosine mask for p=1 (denoted $M_{p=1}$).

Figure 6:
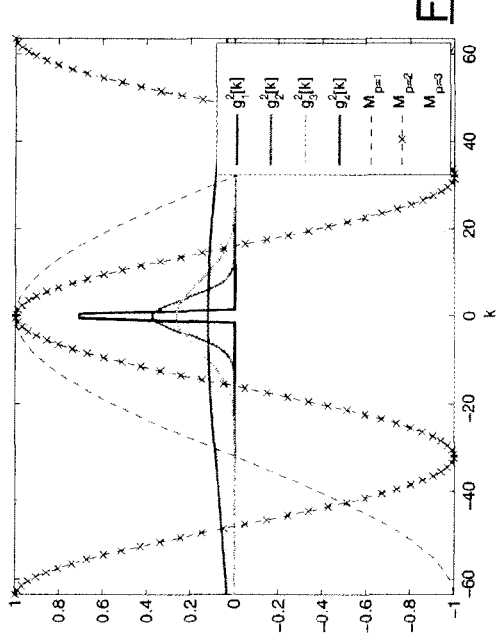
FIG. 6 illustrates the selection of a prototype filter presenting an optimal time resolution parameter.

As illustrated in FIG. 6, the function $g_3^2[k]$ fulfils these conditions. In this FIG. 6, the variable $E_{out}$ corresponds to the energy outside the positive part of the cosine mask for p=1 ($M_{p=1}$).

For example, the temporal resolution parameter $T_r$ according to this first variant is obtained by implementing the algorithm described here below. This algorithm is initialized by assuming $T_r=1$, then the value of the temporal resolution parameter $T_r$ is made to decrease until the value of the variable $E_{out}$ is below a predetermined threshold.

At initialization, the following are given: $T_r=1$, $$\delta = \frac{1}{M},$$

$\epsilon = 10^{-3}$ et $\xi_T = 10^{-3}$, with:
- $\delta$ being a step of decrementation of the temporal resolution parameter;
- $\epsilon$ a threshold corresponding to the maximum value of energy tolerated outside the positive part of the mask $M_{p=1}$;
- $\xi_T$ a time-frequency localization parameter.

Then, a filter denoted as $MD_{T_r}$ is generated such that:

$$\frac{F(0)}{2^K} \frac{\Gamma(K+1)}{\Gamma(K/2+1-k \cdot T_r)\Gamma(K/2+1+k \cdot T_r)}, \text{ with } T_r = 1.$$

So long as $E_{out}(MD_{T_r}) < \epsilon$, the following steps are performed:

$T_r = T_r - \delta;$ generation of the filter $MD_{T_r}$ with $T_r = T_r - \delta;$
if $1 - \xi(MD_{T_r}) > \xi_T$:
then $T_r = T_r + \delta$ and the algorithm is stopped.

According to a second variant, also called MWC $\beta$ or "Maximum Weighted Combining $\beta$" criterion, it is sought to determine the value of the temporal resolution parameter $T_r$ which maximizes a linear combination of the first parameters $\beta_0$ and second parameter $\beta_I$.

It is then sought to resolve the following problem of maximization:

$$\max_{T_r}\{w\beta_0 - (1-w)\beta_I\},$$

with the constraint $\xi(T_r) \in ]1-\xi_T, 1]$
where w is a weighting factor of the first and second parameters $\beta_0$ and $\beta_I$, such that $0 \leq w \leq 1$.

The value of the weighting parameter w can be obtained by simulation so as to obtain the lowest error rate. Experience shows that w=0.95 gives quasi-optimal performance. However, very different initialization choices also give good results.

For this problem of maximization, the parameter setting criterion denoted as $\Delta$ max, can be chosen at an arbitrarily high negative value.

For example, the temporal resolution parameter $T_r$ according to this second variant is obtained by implementing the algorithm described here below.

At initialization, we take $T_r=1$, $$\delta = \frac{1}{M},$$

w=0.95, $\xi_T=10^{-3}$, and $\Delta^{max}$ as an arbitrarily high negative value, for example $\Delta^{max}=-10^3$.

Then a filter denoted as $MD_{T_r}$ is generated such that:

$$\frac{F(0)}{2^K} \frac{\Gamma(K+1)}{\Gamma(K/2+1-k \cdot T_r)\Gamma(K/2+1+k \cdot T_r)}, \text{ with } T_r = 1.$$

So long as $w\beta_0(MD_{T_r})-(1-w)\beta_I(MD_{T_r}) > \Delta_{max}$, the following steps are performed:

$\Delta_{max} = w\beta_0(MD_{T_r})-(1-w)\beta_I(MD_{T_r})$ $T_r = T_r - \delta;$ generation of the filter $MD_{T_r}$ with $T_r = T_r - \delta;$
if $1-\delta(MD_{T_r}) > \xi_T$:
then $T_r = T_r + \delta$ and the algorithm is stopped.

Figure 7:
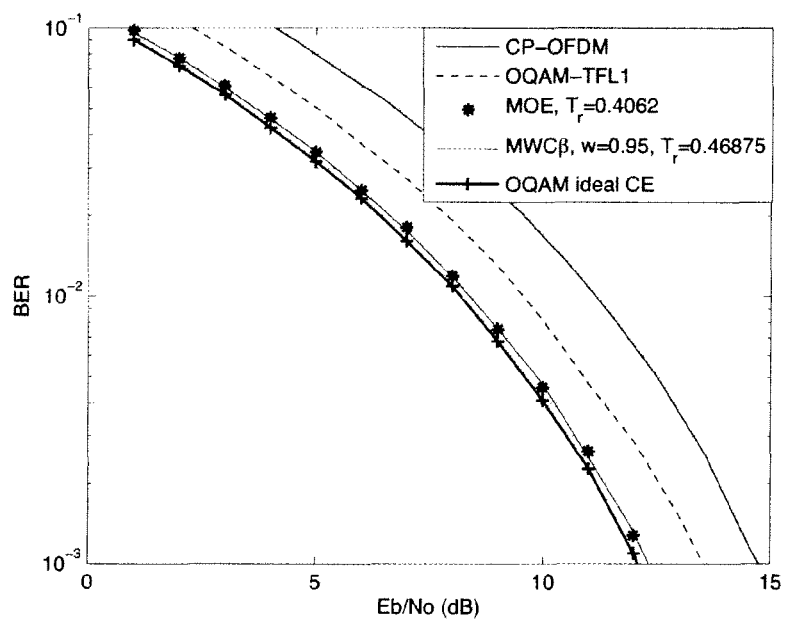
FIG. 7 illustrates the performance of an embodiment of the invention relative to the prior-art solution and to the ideal solution for a phase term $\phi_0=0$.

Finally, referring to FIG. 7, we present the results of simulation used to compare the performance of different transmission systems according to the prior art and according to an embodiment of the invention in comparing the bit error rate (BER) generated by these systems as a function of the ratio $E_b/N_0$ (in dB).

More specifically, FIG. 7 is used to compare the performance of:
two prior-art transmission systems:
   a transmission system using an OFDM modulation and a cyclic prefix denoted as CP-OFDM; and
   a OFDM/OQAM system using the orthogonal prototype filter TFL1 as defined in the document "*Preamble-based channel estimation techniques for OFDM/OQAM over the powerline*" cited here above both for the preamble (preamble symbols) and the payload (data symbols), denoted as OQAM-TFL1;
two transmission systems according to embodiments the invention:
   an OFDM/OQAM system using a first prototype filter optimized according to the MOE criterion for a temporal resolution parameter $T_r=0.4062$, for the preamble (preamble symbols) and a second orthogonal prototype filter for the payload (data symbols) denoted as MOE;
   an OFDM/OQAM system using a first prototype filter optimized according to the MWC $\beta$ criterion for a weighting factor w=0.95 and a temporal resolution parameter $T_r=0.46875$, for the preamble (preamble symbols) and a second orthogonal prototype filter for the payload (data symbols) denoted as MWC $\beta$; and
   an OFDM/OQAM transmission system showing a perfect channel estimation, denoted as OQAM ideal CE.

Figure 1:
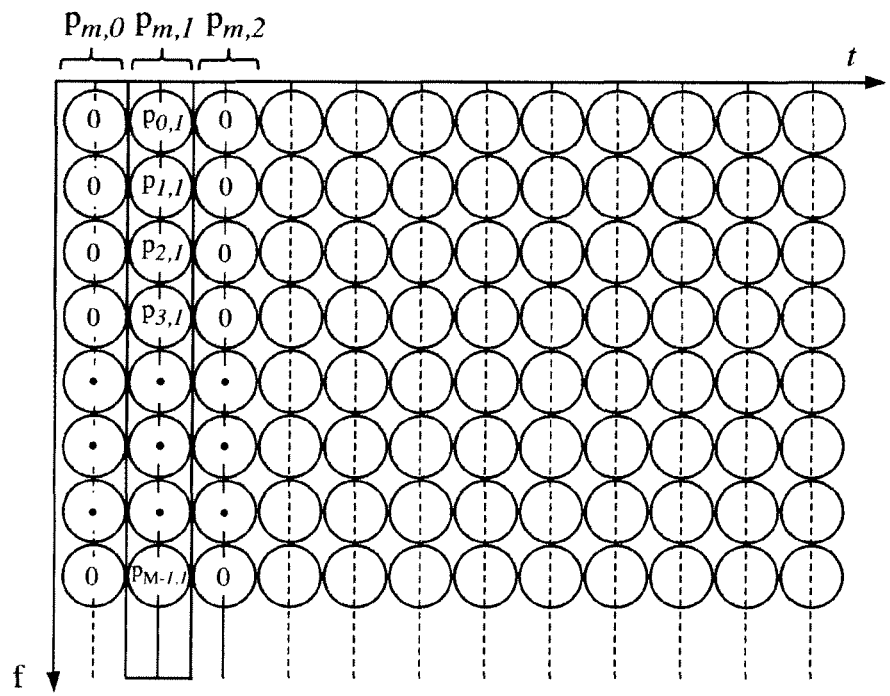
FIG. 1, described with reference to the prior art, illustrates a particular preamble structure.

The OFDM/OQAM transmission systems in this example of simulation use the preamble structure IAM1 as defined with reference to the prior art and illustrated in FIG. 1 and a phase term of the OFDM/OQAM signal equal to zero ($\phi_0=0$).

The simulation parameters are:
M=128, QPSK constellation;
no channel encoding;
length of cyclic prefix for the CP-OFDM transmission set at M=8;
CPL channel model as described in the document Y. H. Ma, P. L. So, and E. Gunawan, "*Performance analysis of ofdm systems for broadband power line communications under impulsive noise and multipath effects*" (vol. 20, no. 2, pp. 674-682, April 2005).

It can be seen in FIG. 7 that the two algorithms proposed in an embodiment of the invention to determine the optimal temporal resolution parameter $T_r$ to be used in the first prototype filter in the MOE and MWC β transmission systems give quasi-identical performance and a gain of about 1.2 dB as compared with the OQAM-TFL1 transmission system for an error rate of $10^{-2}$.

Compared with the CP-OFDM transmission system, the gain is in the range of 3 dB, of which one part $$\left(10\log\frac{M+M/8}{M} \approx 0,5 \text{ dB}\right)$$

comes from the non-use of a cyclic prefix. Furthermore, as compared with a perfect estimation in OFDM/OQAM, the MOE and MWC β transmission systems generate a loss in gain of about 0.2 dB only.

The solution of an embodiment of the invention therefore makes it possible to obtain performance very close to ideal performance and therefore to significantly increase the gains as compared with the prior art techniques.

4. Structure of Devices for Transmitting and Receiving

Figure 8:
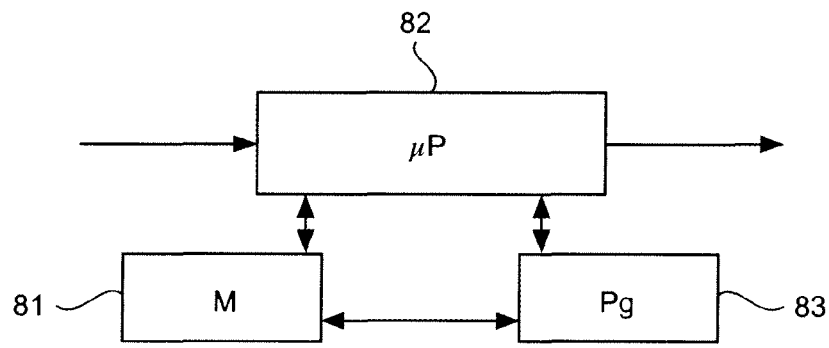
FIGS. 8 and 9 respectively present the structure of a device for transmitting and of a device for receiving implementing two distinct prototype filters according to one particular embodiment of the invention.
Figure 9:
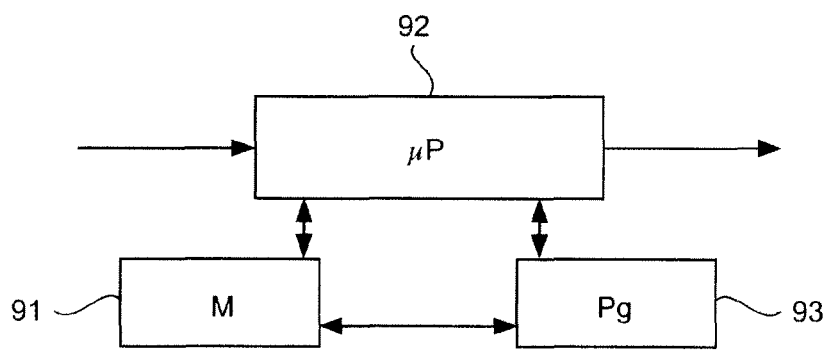

Finally, referring to FIGS. 8 and 9 we present the simplified structure of a device for transmitting and a device for receiving, each implementing two distinct prototype filters (one for the shaping of the preamble and the other for the shaping of the payload) according to the embodiments described here above.

As illustrated in FIG. 8, such a device for transmitting comprises a memory 81 comprising a buffer memory, a processing unit 82 equipped for example with a microprocessor µP, and driven by the computer program 83, implementing the method for transmitting according to an embodiment of the invention.

At initialization, the code instructions of the computer program 83 are for example loaded into a RAM and then executed by the processor of the processing unit 82. The processing unit 82 inputs carriers carrying complex-value data elements corresponding to preamble symbols and real-value data elements corresponding to data symbols. The microprocessor of the processing unit 82 implements the steps of the transmission method described here above, according to the instructions of the computer program 83, to shape the carriers of the multicarrier signal. To this end, the device for transmitting comprises, in addition to the buffer memory 81, means for shaping the carriers, comprising a first prototype filter filtering the carriers carrying the complex-value data elements corresponding to the preamble symbols, and a second prototype filter filtering the carriers carrying the real-value data elements corresponding to the data symbols. These means are driven by the microprocessor of the processing unit 82. The processing unit 82 therefore transmits a shaped multicarrier signal to at least one device for receiving.

As illustrated in FIG. 9, such a device for receiving for its part comprises a memory 91 comprising a buffer memory, a processing unit 92 equipped for example with a microprocessor µP, and driven by the computer program 93, implementing the method for receiving according to an embodiment of the invention.

At initialization, the code instructions of the computer program 93 are for example loaded into a RAM and then executed by the processing unit 92. The processing unit 92 inputs carriers having undergone interference corresponding to preamble symbols and data symbols of a multicarrier signal. The microprocessor of the processing unit 92 implements the steps of the reception method described here above, according to the instructions of the computer program 93 to shape the received carriers. To this end, the device for receiving comprises, in addition to the buffer memory 91, means for shaping the carriers, comprising a first prototype filter filtering the received carriers associated with the preamble symbols and a second prototype filter filtering the received carriers associated with the data symbols. These means are driven by the microprocessor of the processing unit 92.

Although the present disclosure has been described with reference to one or more examples, workers skilled in the art will recognize that changes may be made in form and detail without departing from the scope of the disclosure and/or the appended claims.

The invention claimed is:

1. A method comprising:
   providing a multicarrier signal formed by a temporal succession of multicarrier symbols comprising:
   at least one preamble formed by at least three consecutive multicarrier symbols, known as preamble symbols, carrying complex-value data elements each associated with a carrier of said signal, and
   multicarrier symbols, called data symbols, carrying real-value data elements each associated with a carrier of said signal, and
   shaping said carriers, implementing:
   a filtering, by a first prototype filter g[k], of the carriers carrying said complex-value data elements, corresponding to said preamble symbols, enabling said preamble symbols to be shaped, wherein said first prototype filter g[k] takes the following discrete form:

$$g[k] = \frac{F(0)}{2^K} \frac{\Gamma(K+1)}{\Gamma(K/2+1-k\cdot T_r)\Gamma(K/2+1+k\cdot T_r)}$$

with:
$K=L_g-1$ with $L_g$ being the length of said first prototype filter;
$F(0)$ being a constant;
$\Gamma(\cdot)$ being the gamma function; and
$T_r$ being a temporal resolution parameter; and
a filtering, by a second prototype filter, distinct from said first prototype filter, of the carriers carrying said real-value data elements corresponding to said data symbols, enabling said data symbols to be shaped.

2. The method according to claim 1, wherein said preamble comprises two end preamble symbols ($p_{m,0}$, $p_{m,2}$) constituted by data elements carrying a zero value framing at least one central preamble symbol ($p_{m,1}$) constituted by pilots $p_i$ carrying a value equal to 1 or −1, with i∈[0,M−1] being the index of the carrier associated with the pilot $p_i$ and M being the number of carriers associated with the central preamble symbol such that, for k=0, ..., M/4−1:

$$p_{4k} = p_{4k+1} = 1 \text{ and}$$ (5)

$$p_{4k+2} = p_{4k+3} = -1.$$

3. The method according to claim 1, wherein said second prototype filter comprises an orthogonal or bi-orthogonal filter.

4. The method according to claim 1, comprising a step of determining said temporal resolution parameter $T_r$ of the first prototype filter g[k], on the basis of a first parameter $\beta_0$ and a second parameter $\beta_I$, such that:

$$-\beta_0 = \left| \sum_k g^2[k] \cos\left(2\pi \frac{k}{M}\right) \right| \text{ and}$$

$$-\beta_I = \left| \sum_p j^p \sum_k g^2[k] \cos\left(2\pi \frac{pk}{M}\right) \right|,$$

with $j^2 = -1$, M being the number of carriers per multicarrier symbol and $L_g = M$, said determining step making it possible to maximize said first parameter $\beta_0$ and/or minimize said second parameter $\beta_I$.

5. The method according to claim 1, comprising a step of determining said temporal resolution parameter $T_r$ of the first prototype filter g[k], on the basis of a linear combination of a first parameter $\beta_0$ and a second parameter $\beta_I$, equal to $w\beta_0 - (1-w)/\beta_I$, such that:

w is a weighting factor such that $0 \le w \le 1$;

$$-\beta_0 = \left| \sum_k g^2[k] \cos\left(2\pi \frac{k}{M}\right) \right|; \text{ and}$$

$$-\beta_I = \left| \sum_p j^p \sum_k g^2[k] \cos\left(2\pi \frac{pk}{M}\right) \right|;$$

with $j^2 = -1$, M being the number of carriers per multicarrier symbol and $L_g = M$, said determining step making it possible to maximize said linear combination.

6. A method comprising:

receiving a multicarrier signal formed by a temporal succession of multicarrier symbols comprising, at transmission:

at least one preamble formed by at least three consecutive multicarrier symbols, known as preamble symbols, carrying complex-value data elements each associated with a carrier of said signal, and multicarrier symbols, called data symbols, carrying real-value data elements each associated with a carrier of said signal, shaping received carriers, implementing:

a filtering of the received carriers associated with the preamble symbols by a first prototype filter g[k], wherein said first prototype filter g[k] takes the following discrete form:

$$g[k] = \frac{F(0)}{2^K} \frac{\Gamma(K+1)}{\Gamma(K/2+1-k \cdot T_r)\Gamma(K/2+1+k \cdot T_r)}$$

with:
$K = L_g - 1$ with $L_g$ being the length of said first prototype filter;
F(0) being a constant;
$\Gamma(\cdot)$ being the gamma function; and
$T_r$ being a temporal resolution parameter; and a filtering of the received carriers associated with the data symbols by a second prototype filter, distinct from said first prototype filter.

7. A computer program stored on a computer-readable memory and comprising instructions for implementing a method when said program is executed by a processor, wherein the method comprises:

providing a multicarrier signal formed by a temporal succession of multicarrier symbols comprising:

at least one preamble formed by at least three consecutive multicarrier symbols, known as preamble symbols, carrying complex-value data elements each associated with a carrier of said signal, and multicarrier symbols, called data symbols, carrying real-value data elements each associated with a carrier of said signal, and shaping said carriers, implementing:

a filtering, by a first prototype filter g[k], of the carriers carrying said complex-value data elements, corresponding to said preamble symbols, enabling said preamble symbols to be shaped, wherein said first prototype filter g[k] takes the following discrete form:

$$g[k] = \frac{F(0)}{2^K} \frac{\Gamma(K+1)}{\Gamma(K/2+1-k \cdot T_r)\Gamma(K/2+1+k \cdot T_r)}$$

with:
$K = L_g - 1$ with $L_g$ being the length of said first prototype filter;
F(0) being a constant;
$\Gamma(\cdot)$ being the gamma function; and
$T_r$ being a temporal resolution parameter; and a filtering, by a second prototype filter, distinct from said first prototype filter, of the carriers carrying said real-value data elements corresponding to said data symbols, enabling said data symbols to be shaped.

8. A device for transmitting a multicarrier signal formed by a temporal succession of multicarrier symbols, comprising:

at least one preamble formed by at least three consecutive multicarrier symbols, known as preamble symbols, carrying complex-value data elements each associated with a carrier of said signal, and multicarrier symbols, called data symbols, carrying real-value data elements each associated with a carrier of said signal, wherein said device for transmitting comprises shaping filters, comprising:

a first prototype filter g[k] filtering the carriers carrying said complex-value data elements, corresponding to said preamble symbols, enabling said preamble symbols to be shaped, wherein said first prototype filter g[k] takes the following discrete form:

$$g[k] = \frac{F(0)}{2^K} \frac{\Gamma(K+1)}{\Gamma(K/2+1-k\cdot T_r)\Gamma(K/2+1+k\cdot T_r)}$$

with:
- $K=L_g-1$, with $L_g$ being the length of said first prototype filter;
- $F(0)$ being a constant;
- $\Gamma(\bullet)$ being the gamma function; and
- $T_r$ being a temporal resolution parameter; and a second prototype filter, distinct from said first prototype filter, filtering the carriers carrying said real-value data elements corresponding to said data symbols, enabling said data symbols to be shaped.

9. A device for receiving a multicarrier signal formed by a temporal succession of multicarrier symbols, comprising at transmission:
- at least one preamble formed by at least three consecutive multicarrier symbols, known as preamble symbols, carrying complex-value data elements each associated with a carrier of said signal, and
- multicarrier symbols, called data symbols, carrying real-value data elements each associated with a carrier of said signal, wherein said device comprises shaping filters, comprising:
- a first prototype filter g[k] filtering the received carriers associated with the preamble symbols, wherein said first prototype filter g[k] takes the following discrete form:

$$g[k] = \frac{F(0)}{2^K} \frac{\Gamma(K+1)}{\Gamma(K/2+1-k\cdot T_r)\Gamma(K/2+1+k\cdot T_r)}$$

with:
- $K=L_g-1$, with $L_g$ being the length of said first prototype filter;
- $F(0)$ being a constant;
- $\Gamma(\bullet)$ being the gamma function; and
- $T_r$ being a temporal resolution parameter; and a second prototype filter distinct from the first prototype filter, filtering the received carriers associated with the data symbols.

10. A computer program stored on a computer-readable memory and comprising instructions for implementing a method when said program is executed by a processor, wherein the method comprises:
- receiving a multicarrier signal formed by a temporal succession of multicarrier symbols comprising, at transmission:
  - at least one preamble formed by at least three consecutive multicarrier symbols, known as preamble symbols, carrying complex-value data elements each associated with a carrier of said signal, and
  - multicarrier symbols, called data symbols, carrying real-value data elements each associated with a carrier of said signal,
- shaping received carriers, implementing:
  - a filtering of the received carriers associated with the preamble symbols by a first prototype filter g[k], wherein said first prototype filter g[k] takes the following discrete form:

$$g[k] = \frac{F(0)}{2^K} \frac{\Gamma(K+1)}{\Gamma(K/2+1-k\cdot T_r)\Gamma(K/2+1+k\cdot T_r)}$$

with:
- $K=L_g-1$ with $L_g$ being the length of said first prototype filter;
- $F(0)$ being a constant;
- $\Gamma(\bullet)$ being the gamma function; and
- $T_r$ being a temporal resolution parameter; and a filtering of the received carriers associated with the data symbols by a second prototype filter, distinct from said first prototype filter.

11. A method comprising:
providing a multicarrier signal formed by a temporal succession of multicarrier symbols comprising:
- at least one preamble formed by at least three consecutive multicarrier symbols, known as preamble symbols, wherein said preamble comprises two end preamble symbols ($p_{m,0}$, $p_{m,2}$) constituted by complex data elements carrying a zero value framing at least one central preamble symbol ($p_{m,1}$) constituted by pilots $p_i$ carrying a value equal to 1 or −1, with $i \in [0, M-1]$ being the index of a carrier of said signal associated with the pilot $p_i$ and M being the number of carriers associated with the central preamble symbol such that, for k=0, ..., M/4−1:

$p_{4k}=p_{4k+1}=1$ and $p_{4k+2}=p_{4k+3}=-1$; and

- multicarrier symbols, called data symbols, carrying real-value data elements each associated with a carrier of said signal, and shaping said carriers, implementing:
- a filtering, by a first prototype filter, of the carriers carrying said complex-value data elements, corresponding to said preamble symbols, enabling said preamble symbols to be shaped, and
- a filtering, by a second prototype filter, distinct from said first prototype filter, of the carriers carrying said real-value data elements corresponding to said data symbols, enabling said data symbols to be shaped.

* * * * *